(12) United States Patent
Okada et al.

(10) Patent No.: US 8,390,861 B2
(45) Date of Patent: Mar. 5, 2013

(54) INFORMATION PROCESSING APPARATUS, METHOD, AND RECORDING MEDIUM CONTROLLING THE DISPLAY OF PRINTING OPTIONS

(75) Inventors: Takuya Okada, Toyokawa (JP); Tomoyuki Atsumi, Toyohashi (JP); Katsuaki Wakui, Toyokawa (JP); Yuji Kawamura, Hachioji (JP); Tetsuya Tokumoto, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 429 days.

(21) Appl. No.: 12/726,036

(22) Filed: Mar. 17, 2010

(65) Prior Publication Data

US 2010/0238498 A1    Sep. 23, 2010

(30) Foreign Application Priority Data

Mar. 18, 2009    (JP) .................................. 2009-065512

(51) Int. Cl.
*G06F 15/00*    (2006.01)
*G06F 3/12*    (2006.01)
*G06K 1/00*    (2006.01)

(52) U.S. Cl. ...................................... 358/1.15; 358/1.13
(58) Field of Classification Search .................. 358/1.13, 358/1.14, 1.15, 1.1
See application file for complete search history.

(56) References Cited

U.S. PATENT DOCUMENTS

| 6,724,492 | B1 | 4/2004 | Iwase et al. |
| 7,651,092 | B2 * | 1/2010 | Hirao et al. .................... 271/298 |
| 7,986,418 | B2 * | 7/2011 | Hoshino et al. .............. 358/1.13 |

FOREIGN PATENT DOCUMENTS

| JP | 5-173693 | 7/1993 |
| JP | 8-95436 | 4/1996 |
| JP | 10-275069 | 10/1998 |
| JP | 11-342658 | 12/1999 |
| JP | 2006-277036 | 10/2006 |
| JP | 2007-58428 | 3/2007 |
| JP | 2007-94533 | 4/2007 |
| JP | 2007-108969 | 4/2007 |

OTHER PUBLICATIONS

Japanese Notice of Grounds of Rejection mailed Jan. 5, 2011, directed to counterpart Japanese Application No. 2009-065512; 7 pages.

* cited by examiner

*Primary Examiner* — Douglas Tran
(74) *Attorney, Agent, or Firm* — Morrison & Foerster LLP

(57) ABSTRACT

Setting items in a print setting screen are updated and displayed in response to a changing operation. It is determined whether or not print settings are changed from the initial state. If it is determined that print settings are changed from the initial state, a test print button is displayed. If it is determined that print settings are not changed from the initial state, a full print button is displayed.

21 Claims, 16 Drawing Sheets

INFORMATION PROCESSING APPARATUS, METHOD, AND RECORDING MEDIUM CONTROLLING THE DISPLAY OF PRINTING OPTIONS

This application is based on Japanese Patent Application No. 2009-065512 filed with the Japan Patent Office on Mar. 18, 2009, the entire content of which is hereby incorporated by reference.

BACKGROUND OF THE INVENTION

1. Field of the Invention

The present invention relates to an information processing apparatus for printing output information from software applications (ex. word processors) operating on computers.

2. Description of the Related Art

In conventional printing systems, when printing image data (data files created by applications) saved in secondary storage devices of computers, users execute printing through the following procedure.

A description will be made, for example, to a case where Windows® is used as Operating System (OS) of computers. On this operating system, data to be printed is saved in the form of file data.

A user finds the file data to be printed and then starts the application that created the file data (for example, a word processor that is a document editing application, spreadsheet software, or the like) to open the file data to be printed.

Then, a print instruction provided as a service of the application is executed to do printing.

More specifically, a printing process in a computer is performed by starting a document editing application on a computer, performing such processing as creating a new document or opening a saved document file for editing, and then activating a printing processing function of the document editing application for performing the printing process.

Upon execution of the printing process, the document editing application invokes a printer driver through an intermediate module (GDI (Graphical Device Interface) under the OS on the computer, so that the invoked printer driver creates PDL (page description language) that can be interpreted by a controller of an image forming apparatus for doing printing.

When the user clicks on a print menu during processing on the document editing application, a user interface for print settings concerning printing appears.

Specifically, a variety of items concerning print settings, such as paper size, resolution, paper orientation, and number of copies, can be set.

Meanwhile, in recent years, in order to enhance efficiency and quality in a copy processing operation, a function of executing test printing is provided, in which when large volume printing is done, only one page is experimentally printed without doing full printing. Then, after the result of test printing is examined and whether desired quality is achieved or not is checked, and if satisfactory, then only the required amount of copy is executed. In this respect, Japanese Laid-Open Patent Publication No. 8-095436 discloses a technique of finely adjusting print settings after test printing on an interface screen of an image forming apparatus.

On the other hand, when test printing is done, in consideration of resource saving and visibility improvement, there is a possibility of making print settings different from a preset format set as print settings for full (actual) printing. For example, 2-in-1 layout may be executed or color print may be set to monochrome print. If print settings are changed, it is necessary to reset the print settings to those in accordance with the original preset format in order to do full printing. However, it is necessary to grasp which item was changed, which is cumbersome.

SUMMARY OF THE INVENTION

The present invention is made to solve the aforementioned problem. An object of the present invention is to provide an information processing apparatus capable of executing printing convenient for users, a method of controlling an information processing apparatus, and a control program for an information processing apparatus.

According to an exemplified embodiment, an information processing apparatus transfers image data created by a software application operating on a computer to an image forming apparatus for printing. The information processing apparatus includes a display for displaying information and a controller for controlling the information processing apparatus. The controller displays on the display a print setting screen in which prescribed print setting information showing a manner of printing of the image data in the image forming apparatus is set, which is transferred in association with the image data when printing of the image data is to be executed. The controller accepts a change in settings of the prescribed print setting information in accordance with a user operation in the print setting screen and updates the print setting screen when the change in settings of the prescribed print setting information is accepted. The controller displays in the print setting screen a print button being used for giving an instruction to execute full printing before updating the print setting screen, and displays a test print button being used for giving an instruction to execute test printing upon updating the print setting screen.

Preferably, in connection with the updated print setting screen, the print button for giving an instruction to execute full printing is displayed together with the test print button for executing test printing.

Preferably, a plurality of setting selection items allowing the prescribed print setting information to be changed in accordance with a user operation are displayed in the print setting screen. The controller changes display of a setting selection item having a change accepted, among the plurality of setting selection items, in accordance with a user operation in the print setting screen.

Preferably, the controller combines image data indicating test print with the image data when an instruction to execute the test print button is given, in connection with the print setting screen updated in accordance with a user operation, and transfers a print job including the combined image data to the image forming apparatus.

Preferably, in connection with the print setting screen updated in accordance with a user operation, the controller redisplays the print setting screen when an instruction to execute the test print button is given.

In particular, the controller detects completion of the test printing in the image forming apparatus when an instruction to execute the test print button is given, in connection with the print setting screen updated in accordance with the user operation, and redisplays the print setting screen when completion of the test printing in the image forming apparatus is detected.

In particular, in connection with the print setting screen updated in accordance with the user operation, the print setting screen set when an instruction to execute the test print button is given is redisplayed.

According to an exemplified embodiment, a method of controlling an information processing apparatus transferring image data created by a software application operating on a computer to an image forming apparatus for printing includes the steps of: displaying on a display a print setting screen in which prescribed print setting information showing a manner of printing of the image data in the image forming apparatus is set, which is transferred in association with the image data when printing of the image data is to be executed; accepting a change in settings of the prescribed print setting information in accordance with a user operation in the print setting screen; and updating the print setting screen when the change in settings of the prescribed print setting information is accepted. The step of displaying includes the step of displaying in the print setting screen a print button being used for giving an instruction to execute full printing, and the step of updating includes the step of displaying a test print button being used for giving an instruction to execute test printing.

Preferably, the step of updating the print setting screen includes the step of displaying the print button for giving an instruction to execute full printing together with the test print button for executing test printing.

Preferably, a plurality of setting selection items allowing the prescribed print setting information to be changed in accordance with a user operation are displayed in the print setting screen. The step of updating the print setting screen includes the step of changing display of a setting selection item having a change accepted, among the plurality of setting selection items, in accordance with a user operation in the print setting screen.

Preferably, the method further includes the steps of: combining image data indicating test printing with the image data when an instruction to execute the test print button is given, in connection with the print setting screen updated in accordance with a user operation; and transferring a print job including the combined image data to the image forming apparatus.

Preferably, the method further includes the step of redisplaying the print setting screen when an instruction to execute the test print button is given, in connection with the print setting screen updated in accordance with a user operation.

In particular, the step of redisplaying the print setting screen includes the steps of: detecting completion of the test printing in the image forming apparatus when an instruction to execute the test print button is given, in connection with the print setting screen updated in accordance with the user operation; and redisplaying the print setting screen when completion of the test printing in the image forming apparatus is detected.

In particular, the step of redisplaying the print setting screen redisplays the print setting screen set when an instruction to execute the test print button is given, in connection with the print setting screen updated in accordance with the user operation.

According to an exemplified embodiment, a recording medium has a control program recorded thereon for an information processing apparatus transferring image data created by a software application operating on a computer to an image forming apparatus for printing. The control program allows the computer to execute the steps of: displaying on a display a print setting screen in which prescribed print setting information showing a manner of printing of the image data in the image forming apparatus is set, which is transferred in association with the image data when printing of the image data is to be executed; accepting a change in settings of the prescribed print setting information in accordance with a user operation in the print setting screen; and updating the print setting screen when the change in settings of the prescribed print setting information is accepted. The step of displaying includes the step of displaying in the print setting screen a print button being used for giving an instruction to execute full printing, and the step of updating includes the step of displaying a test print button being used for giving an instruction to execute test printing.

Preferably, the step of updating the print setting screen includes the step of displaying the print button for giving an instruction to execute full printing together with the test print button for executing test printing.

Preferably, a plurality of setting selection items allowing the prescribed print setting information to be changed in accordance with a user operation are displayed in the print setting screen. The step of updating the print setting screen includes the step of changing display of a setting selection item having a change accepted, among the plurality of setting selection items, in accordance with a user operation in the print setting screen.

Preferably, the control program allows the computer to further execute the steps of: combining image data indicating test printing with the image data when an instruction to execute the test print button is given, in connection with the print setting screen updated in accordance with a user operation; and transferring a print job including the combined image data to the image forming apparatus.

Preferably, the control program allows the computer to further execute the step of redisplaying the print setting screen when an instruction to execute the test print button is given, in connection with the print setting screen updated in accordance with a user operation.

In particular, the step of redisplaying the print setting screen includes the steps of: detecting completion of the test printing in the image forming apparatus when an instruction to execute the test print button is given, in connection with the print setting screen updated in accordance with the user operation; and redisplaying the print setting screen when completion of the test printing in the image forming apparatus is detected.

In particular, the step of redisplaying the print setting screen redisplays the print setting screen set when an instruction to execute the test print button is given, in connection with the print setting screen updated in accordance with the user operation.

According to an exemplified embodiment, the information processing apparatus updates a print setting screen when a change in settings of prescribed print setting information is accepted, and changes a print button for giving an instruction to execute full printing that is displayed in the print setting screen for setting prescribed print setting information, to a test print button for executing test printing. Accordingly, when a changing operation from the prescribed print setting information is performed, the print button is changed to the test print button in the print setting screen. Therefore, it can easily be grasped that the print settings are for test printing, thereby allowing execution of printing convenient for users.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
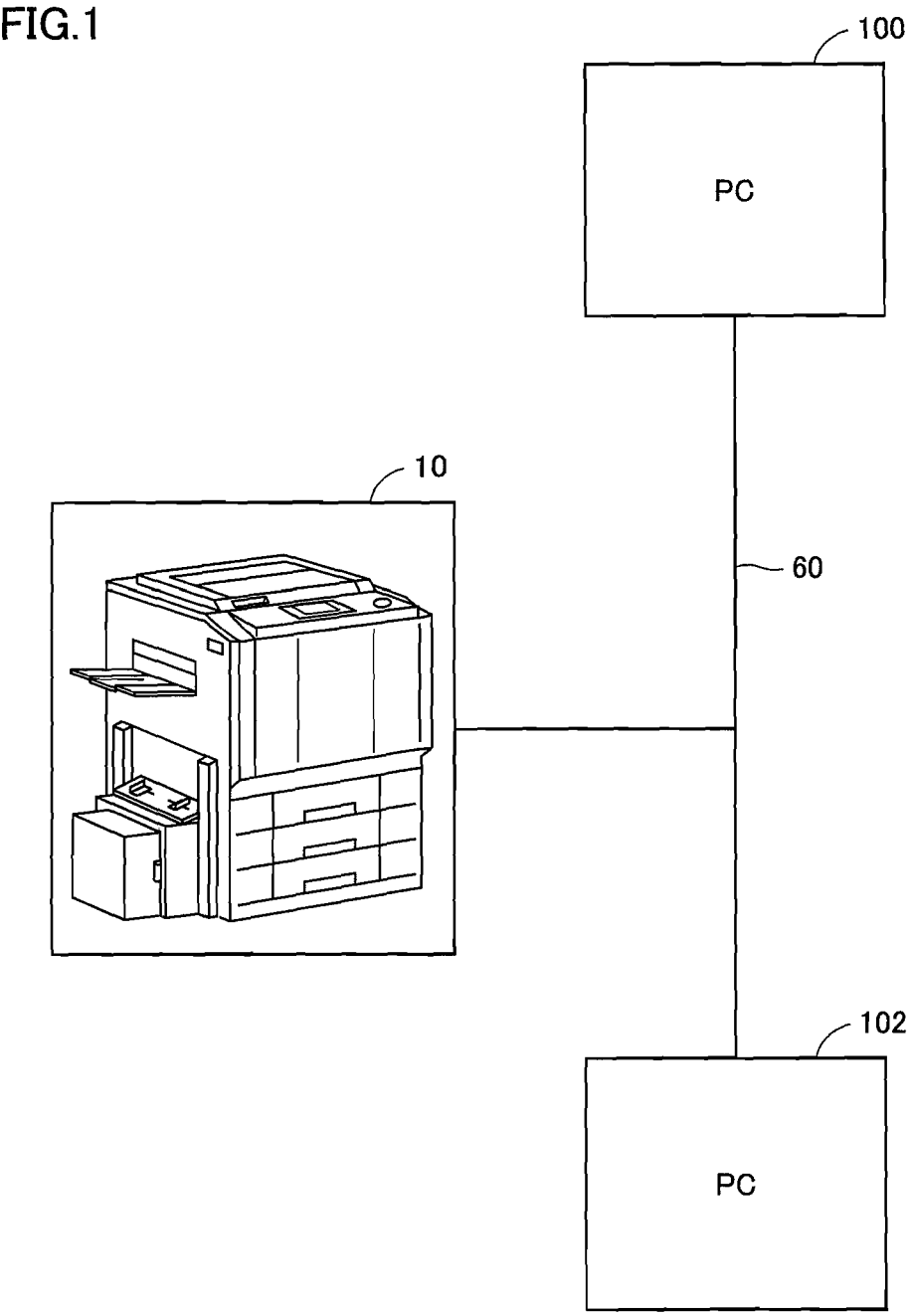
FIG. 1 a diagram showing a configuration of a printing system in accordance with a first embodiment of the present invention.

In the following, embodiments of the present invention will be described with reference to the drawings. In the following description, the same parts and components are denoted with the same reference numerals. Their designations and functions are the same.

First Embodiment

A configuration of a printing system in accordance with a first embodiment of the present invention will be described using FIG. 1.

Referring to FIG. 1, an information processing system in accordance with the first embodiment of the present invention is configured with an image forming apparatus 10 and personal computers (hereinafter also simply referred to as PC) 100, 102 that are information processing apparatuses connected via a network such as LAN (Local Area Network) 60.

Each PC 100, 102 and image forming apparatus 10 are connected so that they can communicate data with each other via LAN 60. In the present invention, image data created on an application running on each PC 100, 102 is output as a print job to image forming apparatus 10. Image forming apparatus 10 receives the print job transmitted from each PC 100, 102 to execute a printing process.

It is noted that a description is made here to a configuration in which two PCs are connected as information processing apparatuses with LAN 60. However, the number of PCs is not limited to two as long as at least one is provided. Furthermore, the present invention is not limited to LAN, and WAN (Wide Area Network) or the like may be employed.

A schematic block diagram of image forming apparatus 10 in accordance with the first embodiment of the present invention will be described using FIG. 2.

Figure 2:
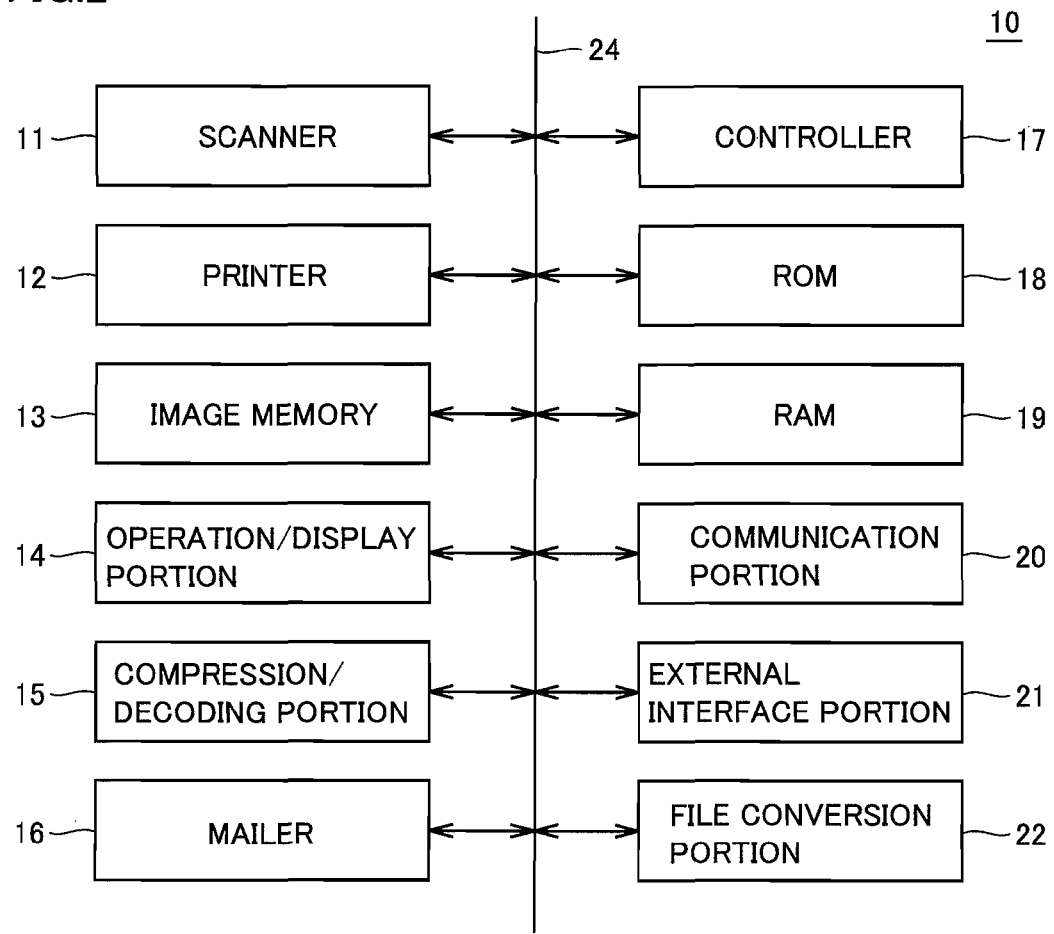
FIG. 2 is a schematic block diagram showing an image forming apparatus in accordance with the first embodiment of the present invention.

Referring to FIG. 2, image forming apparatus 10 in accordance with the first embodiment of the present invention includes a scanner 11, a printer 12, an image memory 13, an operation/display portion 14, a compression/decoding portion 15, a mailer 16, a controller 17, a ROM 18, a RAM 19, a communication portion 20, an external interface portion 21, a file conversion portion 22, and an internal bus 24.

Scanner 11 obtains image data by scanning a document set on a not-shown platen.

Printer 12 prints image data on a prescribed sheet. Image memory 13 temporarily holds image data output to printer 12.

Operation/display portion 14 accepts a variety of operation inputs by users and also displays a variety of setting information.

Compression/decoding portion 15 performs compression/decoding of image data. Mailer 16 executes transmission/reception of emails.

Controller 17 controls the entire image forming apparatus 10 and outputs necessary instructions to each portion.

ROM (Read Only Memory) 18 stores a program and the like for realizing a prescribed function in image forming apparatus 10.

RAM (Random Access Memory) 19 is used as a work area. Communication portion 20 is connected with LAN 60 to communicate data with the outside.

In this example, a print job from PC 100, 102 is received through communication portion 20. External interface portion 21 executes connection with an external device. File conversion portion 22 converts a variety of file formats such as a file format for image data and a file format for emails.

A print job transmitted from PC 100, 102 is received at communication portion 19 through LAN 60. Then, the received print job is saved in RAM 19. Then, print data (drawing data) included in the print job saved in RAM 19 is developed in image memory 13 so that print data is printed on a prescribed sheet. It is noted that print data referred to herein is formed by converting image data created on an application running on each PC 100, 102 into PDL (page description language).

A schematic block diagram of PC in accordance with the first embodiment of the present invention will be described using FIG. 3.

Figure 3:
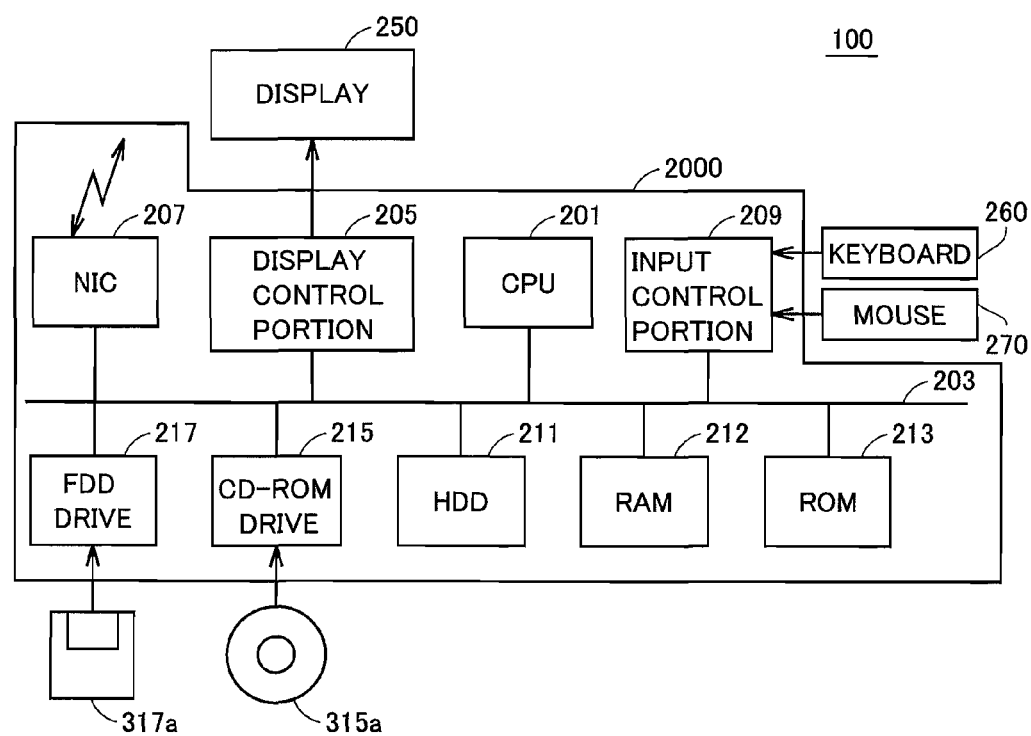
FIG. 3 is a schematic block diagram showing a PC in accordance with the first embodiment of the present invention.

Referring to FIG. 3, PC 100 in accordance with an embodiment of the present invention is configured with a main body portion 2000, a display 250 as display means, and a keyboard 260 as key input means and a mouse 270 as a pointing device which serve as input means. Here, these main body portion 2000, display 250, and keyboard 260 and mouse 270 as input means are separately provided. However, they may be provided integrally with main body portion 2000.

Display 250 may be a liquid crystal display, a CRT (Cathode Ray Tube) display device, a plasma display device, or any other device as long as it is capable of displaying.

Main body portion 2000 includes a CPU (Central Processing Unit) 201 for executing a variety of programs including an Operating System (OS), a RAM 212 temporarily storing data necessary to execute a program portion of CPU 201, a hard disk portion (HDD: Hard Disk Drive) 211 storing in a non-volatile manner data and a program executed in CPU 201, and a ROM 213 storing beforehand a program to be executed on CPU 201. OS is stored beforehand in ROM 213 or HDD 211 and executed to run a variety of applications.

In addition, a printer driver that is a software program for transmitting print jobs to image forming apparatus 10 is stored in HDD 211. The printer driver is read by CPU 201 to implement a function as described later.

Such a program is read by an FD drive 217 or a CD-ROM (Compact Disc-Read Only Memory) drive 215 from a flexible disk 317a or a CD-ROM 315a, respectively. Then, the read program is stored in HDD 211 for use. It is noted that although the program is read from flexible disk 317a, CD-ROM 315a, or the like in this example, the present invention is not limited thereto, and it may be downloaded from a not-shown server in which a printer driver is stored, through LAN 60. Furthermore, although key board 260 and mouse 270 are exemplified as input means in this example, a touch panel may be provided so that input may be done through the touch panel.

CPU 201 accepts an instruction from the user through an operation of keyboard 260 or mouse 270 through an input control portion 209 connected with keyboard 260 or mouse 270 and also outputs to a display control portion 205 a screen output generated through execution of a program.

Display control portion 205 outputs the screen output to display 250.

In addition, CPU 201 transmits a print job to image forming apparatus 10 connected with LAN 60 (or WAN or the like) through a network interface card (NIC) 207 formed of a LAN card or the like.

The aforementioned portions mutually receive and send data through an internal bus 203.

It is noted that the configuration of each PC 100, 102 is similar and therefore a detailed description thereof will not be repeated.

A functional block diagram showing a processing structure concerning a printing function in main body portion 2000 of PC 100 shown in FIG. 3 will be described using FIG. 4.

Figure 4:
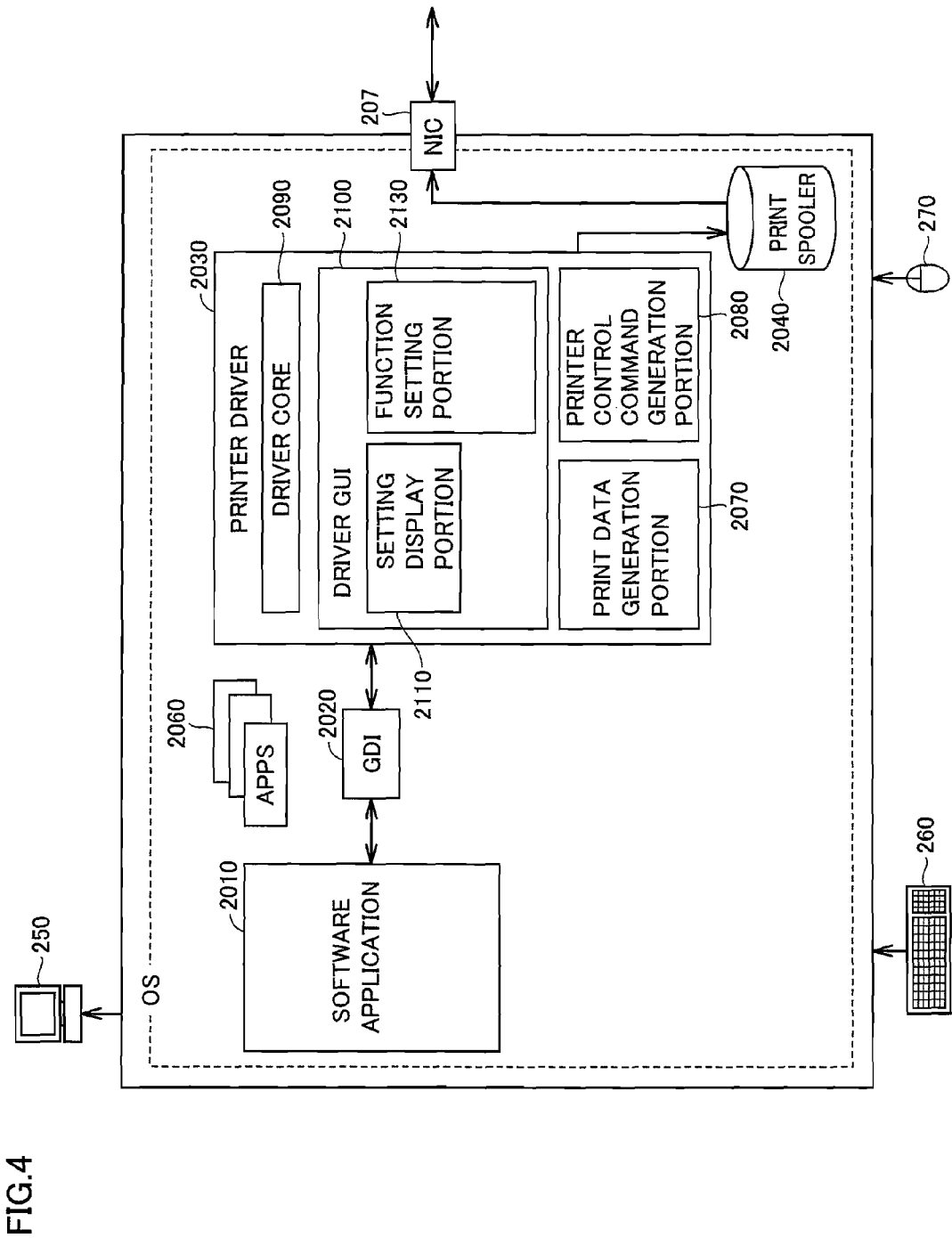
FIG. 4 is a functional block diagram showing a processing structure concerning a printing function in a main body portion of the PC shown in FIG. 3.

Referring to FIG. 4, "OS" shown on the rectangular broken line does not mean that each component in the rectangle is a component of an Operating System (hereinafter referred to as OS (for example, Windows®) but means that the components in the rectangle operate on the OS.

As described above, keyboard 260 as input means or mouse 270 as a pointing device and display 250 as display means are connected with main body portion 2000 of PC 100, thereby implementing a computer system.

It is assumed that main body portion 2000 operates under OS such as Windows®.

Focusing attention only to functional portions of main body portion 2000 that are related to the present invention, the functions on OS are largely classified into activated software application 2010, a Graphic Device Interface (referred to as GDI hereinafter) 2020 that is a part of OS, a printer driver 2030, and a print spooler 2040 temporarily storing data generated by printer driver 2030.

Their designations and functional frame works may vary depending on OS. For example, the designation of a module that is called a GDI printer driver is unique to Windows®, and the equivalent function in any other OS is implemented, for example, by a module called a graphic kernel or a print filter. Print spooler 2040 may also be implemented by incorporating processes in a module called a print queue.

In general, main body portion 2000 comprised of these components is under control of software called basic software (BIOS) under hardware such as CPU 201, HDD 211, RAM 212, and ROM 213 shown in FIG. 2. Software applications operate under that basic software.

Printer driver 2030 or the like is also designed as one of such software applications.

Software application 2010 is software for executing functions, for example, such as a word processor and a spreadsheet and refers to application software operating on the Operating System.

Furthermore, a plurality of software applications 2010 may be activated at any timing and are shown as apps 2060.

A description will now made to a case where any given document editing application is used as software application 2010.

When an operation of editing images such as texts or graphics is mainly performed by software application 2010 and the images are to be printed, a print menu displayed on display 250 is selected by mouse 270 or the like to allow printing to be done.

Then, software application 2010 calls GDI 2020 that is a partial function of the Operating System. GDI 2020 is a basic function group that governs a display device or a printing device for image display, print output, or the like. Various software applications from various companies use this basic function group to run application software without regard to a device-dependent part (hardware).

Then, GDI 2020 takes in information such as drawing ability and print resolution held by a printing device (here, image forming apparatus 10), from printer driver 2030 that manages information dependent on the kind of printing device, processes API (Application Program Interface) function called from software application 2010, and calls a function provided for GDI 2020 by printer driver 2030 depending on the processed content.

The aforementioned function is a predetermined interface (Device Driver Interface (DDI)), and the creator of a printer driver creates the printer driver on the basis of data conversion for outputting data to the actual printing device from that interface.

Printer driver 2030 is configured with a driver core 2090 having control over the entire printer driver, a driver GUI 2100, a print data generation portion 2070, and a printer control command generation portion 2080.

Driver GUI 2100 is configured with modules, namely, a setting display portion 2110 and a function setting portion 2130.

Setting display portion 2110 outputs a print setting screen for displaying print environment settings for the user to display 250 as display means. Function setting portion 2130 executes print environment setting (also simply referred to as print setting) in accordance with an input instruction from the user from keyboard 260 as input means or mouse 270 as a pointing device when the print setting screen is displayed.

Printer driver 2030 executes a process of generating print data (drawing data) in print data generation portion 2070 and also performs a process of generating a printer control command in printer control command generation portion 2080, based on DDI information received from GDI 2020 and the print environment settings set by driver GUI (Graphical User Interface) 2100.

Then, the print data (drawing data) and the printer control command generated in accordance with the print execution instruction are output as a print job to print spooler 2040.

Then, the print job formed of these print data and printer control command is output from print spooler 2040 to image forming apparatus 10 through NIC 207.

Then, in image forming apparatus 10, a prescribed process is executed in accordance with the printer control command included in the print job, so that, for example, print data is printed on a recording sheet.

A process procedure of the driver GUI in accordance with the first embodiment will now be described using FIG. 5.

Figure 5:
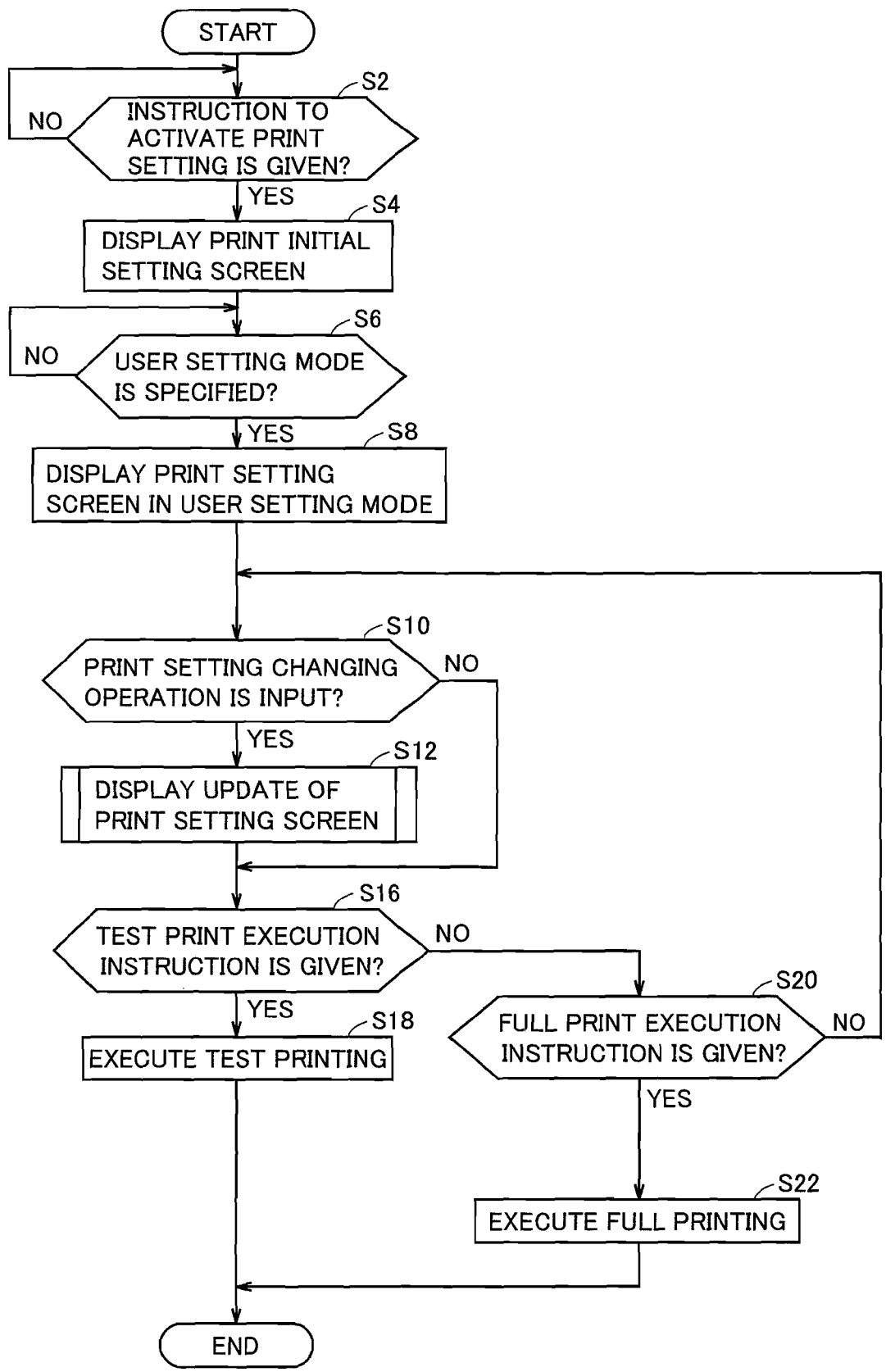
FIG. 5 is a flowchart illustrating a process procedure of a driver GUI in accordance with the first embodiment of the present invention.

Referring to FIG. 5, first, driver core 2090 determines whether or not an instruction to activate print setting is given or not (step S2).

Specifically, it is determined whether or not input of an instruction to activate a print setting screen for executing print environment setting is given by activating a print processing function of a document editing application after the document editing application is started to perform processes such as creation of a new document and opening and editing of the saved document file. It is noted that an instruction to activate print setting may be started through the user's operation using a start button or may be started concurrently with starting of the document editing application. The starting method is not limited.

Then, if the print setting activating instruction is executed in step S2, driver core 2090 instructs setting display portion 2110 of driver GUI 2100 to display a print initial setting screen (step S4). It is noted that, in the present example, when the print setting activating instruction is executed, the preset initial setting information is read and the print initial setting screen is displayed based on that initial setting information. Alternatively, when a printing process is executed last time, the print setting information at the time of execution of that printing process may be saved, for example, in HDD 211 or the like and the print initial setting screen may be displayed based on the saved print setting information.

A print setting screen 40 displayed on display 250 by setting display portion 2110 of driver GUI 2100 will be described using FIG. 6.

Figure 6:
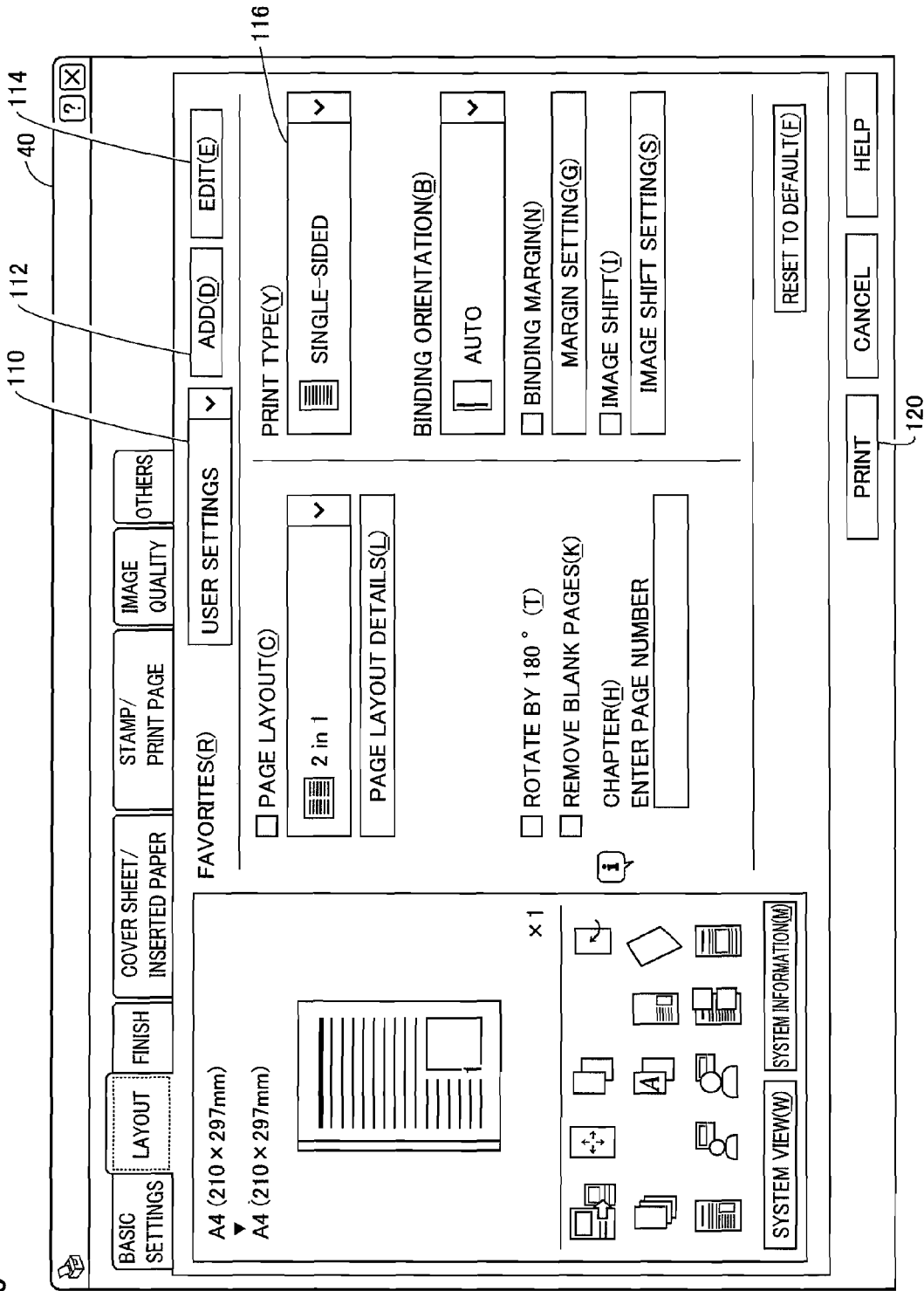
FIG. 6 shows a print setting screen displayed on a display by a setting display portion of the driver GUI.

Referring to FIG. 6, a variety of plurality of setting items concerning print environment settings can be set in print setting screen 40. Specifically, setting concerning a variety of print environments can be made by specifying a plurality of tabs classified by setting items provided on the top, using mouse 270 as a pointing device, keyboard 260, or the like.

Selection of printing paper, image quality, the number of copies, and the like, for example, can be set by specifying a variety of tabs or setting items using mouse 270 or the like.

In this example, a variety of setting items are displayed in a case where a tab "layout" regarding arrangement of image data is specified.

For example, an item button 116 regarding settings of print type is shown, by way of example, to allow the user to operate to change settings such as "single-sided" and "double-sided," for example, using a pull-down menu by specifying item button 116.

Then, it is shown that an item button 110 for mode setting is provided and a "user setting" mode is specified in item button 110 for mode setting. Therefore, this print setting screen 40 corresponds to the print setting screen in the user setting mode, as described later.

In the present first embodiment, a description will be made to a case where the "user setting" mode is set by operating item button 110 for mode setting using mouse 270 as a pointing device.

The "user setting" mode, different from the initial setting mode defined by default, is set by executing print setting in accordance with a prescribed format uniquely set by the user. In this example, it is assumed that print setting information is stored beforehand in HDD 211 or the like as a prescribed format as a "user setting mode" through the user's operation.

Here, in print setting screen 40, an item button 112 for adding mode settings and an item button 114 for editing mode settings are provided. For example, the user can define a new mode by specifying item button 112 for adding mode settings using mouse 270 or the like as a pointing device. In addition, the user can edit the print setting information of the specified mode (here, "user setting" mode) by specifying item button 114 for editing mode settings using mouse 270 or the like as a pointing device. Therefore, when it is intended to change the print setting information of the "user setting" mode set as a prescribed format, it can be changed by specifying item button 114 for editing.

Then, a print button 120 for giving an instruction to execute printing is provided in the bottom region of print setting screen 40. The user specifies print button 120 using mouse 270 or the like as a pointing device to execute a printing process.

In the first embodiment, a process in a case where the user specifies the user setting mode in print setting screen 40 will be described. Therefore, a description will not be made to a process in a case where any other mode, for example, a normal setting mode defined by default is set.

Referring to FIG. 5 again, next, driver core 2090 determines whether or not the user setting mode is specified (step S6).

If the user setting mode is specified in step S6, a print setting screen in the user setting mode is displayed (step S8). Specifically, driver core 2090 instructs driver GUI 2100 in accordance with input to specify the user setting mode through input by mouse 270 or the like so that setting display portion 2110 of driver GUI 2100 displays a print setting screen in the user setting mode based on the print setting information stored in the user setting mode stored in advance.

Then, driver core 2090 determines whether or not a print setting changing operation is input by the user in the print setting screen (step S10).

For example, the user can operate to change settings from "single-sided" to "double-sided" by the pull-down menu by specifying item button 116 regarding settings of print type through input using mouse 270 or the like as a pointing device, in print setting screen 40 illustrated in FIG. 6.

Then, if it is determined that a changing operation is not performed in step S10, the process skips to step S14 (NO in step S10).

On the other hand, if it is determined that a changing operation is performed on an item of print settings through input using the mouse, the keyboard or the like (YES in step S10), driver core 2090 instructs setting display portion 2110 of driver GUI 2100 to execute a print setting screen update display process (step S12).

The print setting screen update display process in accordance with the first embodiment of the present invention will be described using FIG. 7.

Figure 7:
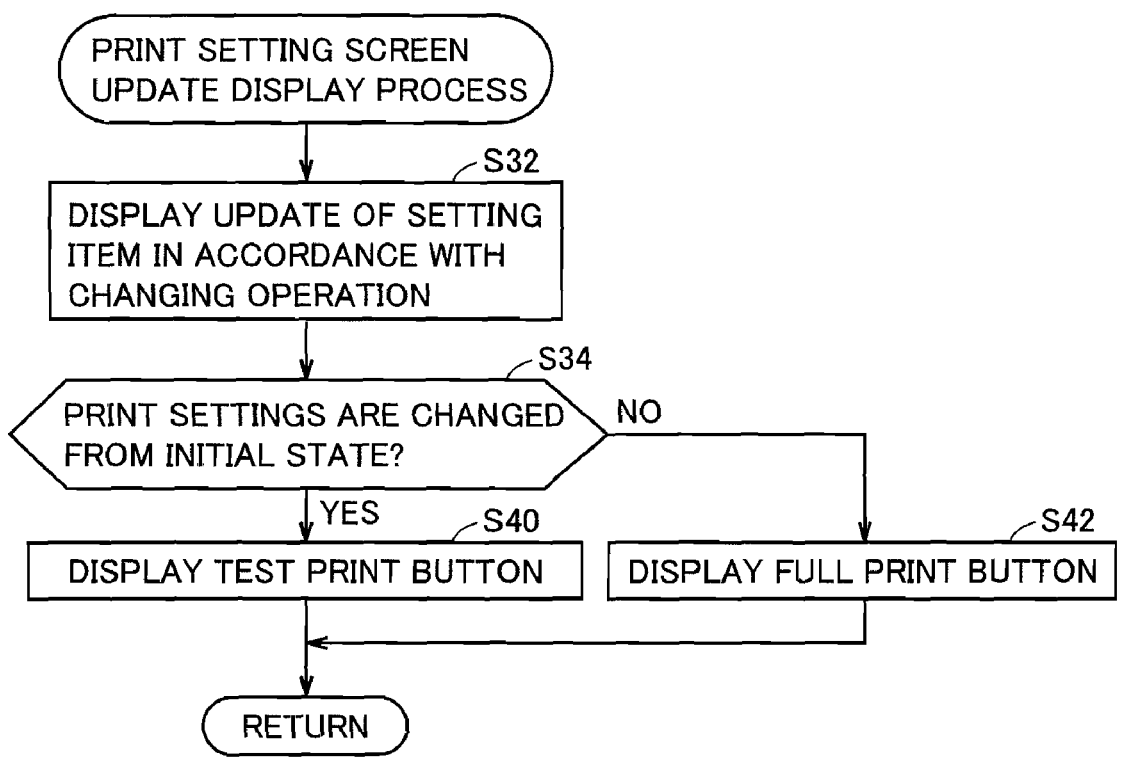
FIG. 7 is a flowchart illustrating a print setting screen update display process in accordance with the first embodiment of the present invention.

Referring to FIG. 7, the setting items in the print setting screen are updated and displayed in accordance with a changing operation (step S32).

Specifically, driver core 2090 instructs driver GUI 2100 in accordance with input by mouse 270 or the like so that setting display portion 2110 of driver GUI 2100 displays a print setting screen with the updated setting items that are operated to change as instructed. Furthermore, function setting portion 2130 of driver GUI 2100 executes environment setting concerning printing based on the print setting information for the setting item that is operated to change as instructed by driver core 2090.

Then, it is determined whether or not the print settings are changed from the initial state (step S34). Specifically, function setting portion 2130 compares the print setting information in the user setting mode with the print setting information for the setting item that is operated to change, to determine whether the print settings are changed from the initial state. Then, if it is determined that the print settings are changed from the initial state, a test print button is displayed (step S40).

On the other hand, if it is determined that the print settings are not changed from the initial state, a full print button is displayed (step S42). Specifically, function setting portion 2130 outputs the comparison result to setting display portion 2110 so that setting display portion 2110 displays the test print button or the full print button in the print setting screen.

Then, the process returns to the process in FIG. 5 again (RETURN).

A print setting screen subjected to the update display process in the user setting mode in accordance with the first embodiment of the present invention will be described using FIG. 8.

Figure 8:
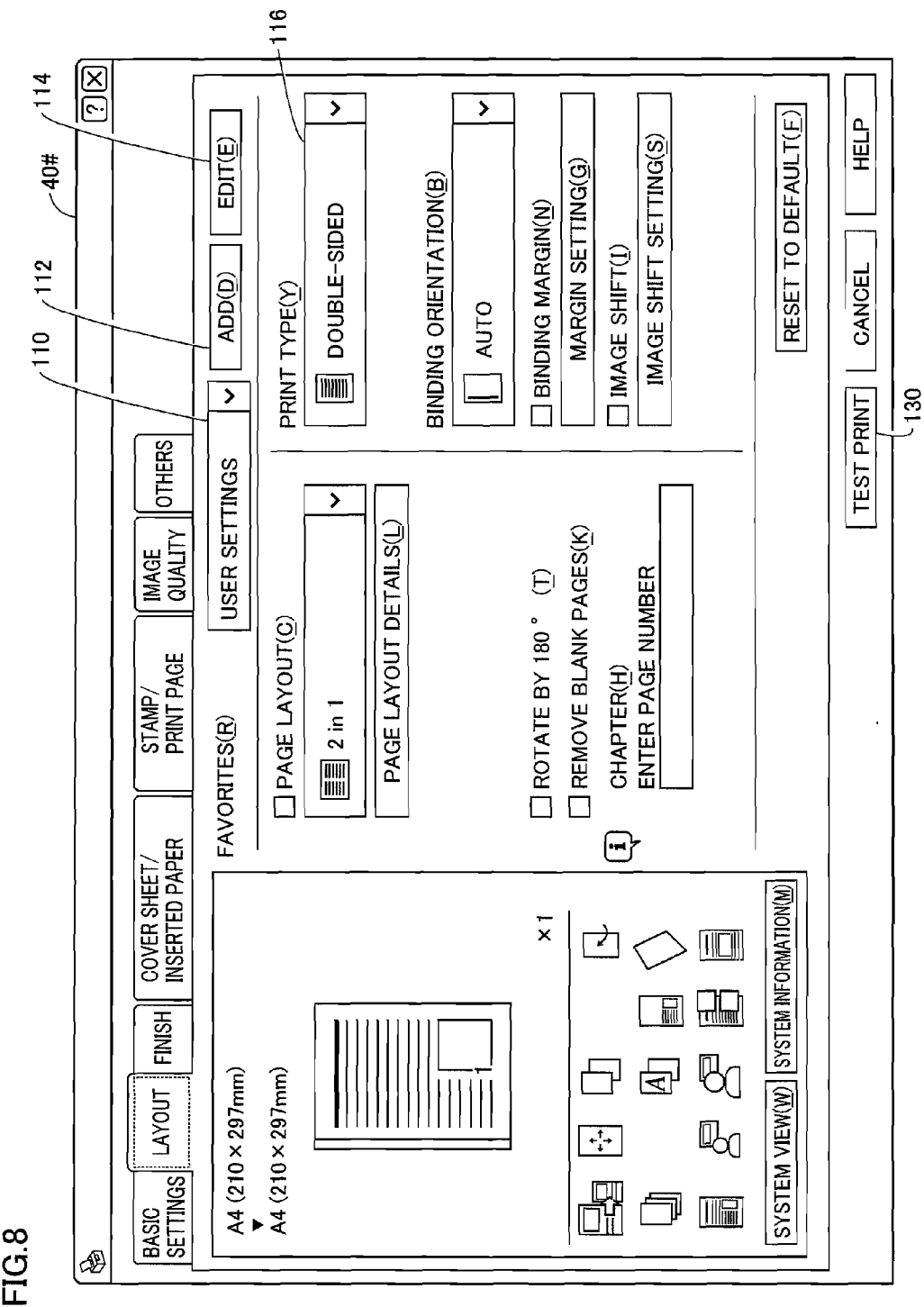
FIG. 8 shows a print setting screen subjected to an update display process in a user setting mode in accordance with the first embodiment of the present invention.

Referring to FIG. 8, a print setting screen 40# differs from print setting screen 40 illustrated in FIG. 6 in that the setting item of the print type has been changed to "double-sided" and in that print button 120 has been changed to a test print button 130.

Therefore, in this screen, the user can visually recognize that the current print settings are not in the initial state in the user setting mode but are the print settings changed from the initial state through the changing operation because display has been changed from print button 120 to test button 130 through the changing operation.

Referring to FIG. 5 again, after the print setting screen update display process (after step S12), driver core 2090 determines whether or not a test print execution instruction is given (step S16).

Specifically, whether a test print execution instruction is given or not can be determined, for example, by determining whether or not the user specifies test print button 130 using mouse 270 or the like in print setting screen 40#.

Then, if it is determined that a test print execution instruction is given in step S16, the process in driver GUI 2100 is ended (END). Specifically, display of print setting screen 40# is terminated.

On the other hand, if it is determined that a test print execution instruction is not given in step S16, it is determined whether or not a full print execution instruction is given (step S20). Specifically, the full print execution instruction can be determined, for example, by determining whether or not the user specifies print button 120 using mouse 270 or the like in print setting screen 40.

Then, if it is determined that a test print execution instruction is given in step S16, the process in driver GUI 2100 is ended (END). Specifically, display of print setting screen 40 is terminated.

Then, if the above-noted test or full print execution instruction is given, driver core 2090 outputs, to print data generation portion 2070 and printer control command generation portion 2080, the set print setting information and image data, which are then output as a print job to print spooler 2040, as described above. Then, the print job formed of print data and a print control command generated in print data generation portion 2070 and printer control command generation portion 2080 is output from print spooler 2040 to image forming apparatus 10 through NIC 207. A printing process is executed in image forming apparatus 10.

On the other hand, if it is determined that a full print execution instruction is not given (NO in step S20), the process returns to step S10 again to determine whether or not a changing operation is input by the user.

Then, the aforementioned process is repeated.

Accordingly, when the user operates to change the environment settings concerning printing in print setting screen 40 in the user setting mode as described above, for example, the screen is updated to print setting screen 40# in accordance with the changing operation and display of print button 120 is changed to test print button 130. Therefore, the user can visually recognize that the current print settings are not in the initial state in the user setting mode but are the print settings changed from the initial state through the changing operation because display of print button 120 is changed to test print button 130.

Furthermore, when the user operates to change environment settings concerning printing in print setting screen 40#, for example, when the setting item of print type is changed from "double-sided" to "single-sided," the screen is updated to print setting screen 40 in accordance with the changing operation and display of test print button 130 is changed to print button 120. Therefore, the user can visually recognize that the current print settings are in the initial state in the user setting mode because display of test print button 130 is changed to print button 120.

Accordingly, the user can easily grasp the changing operation from the user setting mode, and test printing or full printing can be executed in a simple way, thereby allowing execution of printing convenient for users.

First Modification of First Embodiment

Another example of the print setting screen update display process will be described in a first modification of the first embodiment of the present invention. It is noted that the other points are similar to those described in the first embodiment.

A print setting screen update display process in accordance with the first modification of the first embodiment of the present invention will be described using FIG. 9.

Figure 9:
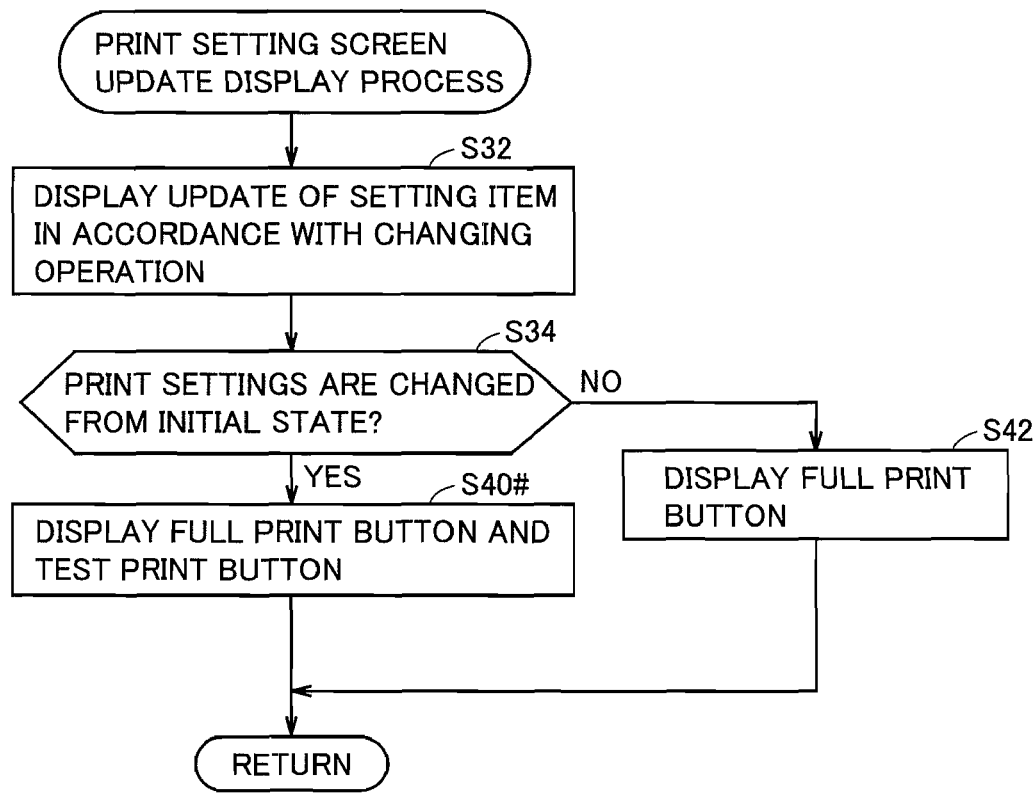
FIG. 9 is a flowchart illustrating a print setting screen update display process in accordance with a first modification of the first embodiment of the present invention.

Referring to FIG. 9, as compared with the process in FIG. 7, step S40 is changed to step S40#.

In step S40#, it is determined whether or not the print setting are changed from the initial state. If it is determined that the print settings are changed from the initial state, the full print button and the test print button are displayed (step S40#). Then, the process returns to the process in FIG. 5 again (RETURN).

A print setting screen subjected to the update display process in the user setting mode in accordance with the first modification of the first embodiment of the present invention will be described using FIG. 10.

Figure 10:
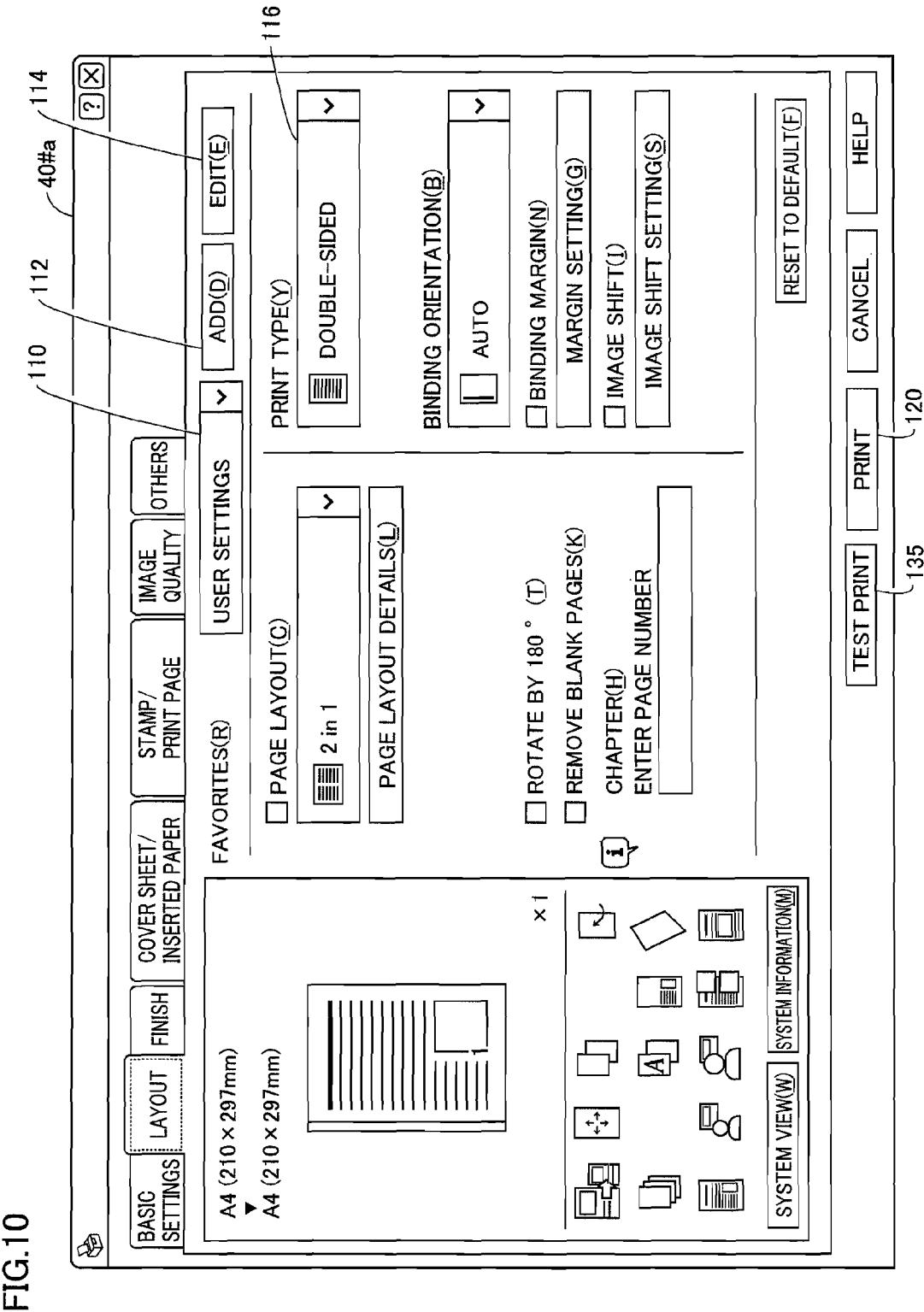
FIG. 10 shows a print setting screen subjected to an update display process in a user setting mode in accordance with the first modification of the first embodiment of the present invention.

Referring to FIG. 10, a print setting screen 40#a subjected to the update display process in the user setting mode in accordance with the first modification of the first embodiment of the present invention differs from print setting screen 40# illustrated in FIG. 8 in that a test print button 135 and print button 120 are displayed together in the bottom field. The other points are similar as illustrated in FIG. 8.

Accordingly, when the user operates to change the environment settings concerning printing in print setting screen 40 in the user setting mode as described above, for example, the screen is updated to print setting screen 40#a in accordance with the changing operation and test print button 135 is displayed together with print button 120. Therefore, the user can visually recognize that the current print settings are not in the initial state in the user setting mode but are the print settings changed from the initial state through the changing operation because test print button 135 is displayed.

Furthermore, when the user operates to change the environment settings concerning printing in print setting screen 40#*a* again, for example, when the setting item of print type is changed from "double-sided" to "single-sided," the screen is updated to print setting screen 40 in accordance with the changing operation and only print button 120 is displayed. Therefore, the user can visually recognize that the current print settings are the print settings in the initial state in the user setting mode because only print button 120 is displayed.

Accordingly, the user can easily grasp the changing operation from the user setting mode, and test printing or full printing can be executed in a simple way, thereby allowing execution of printing convenient for users.

Second Modification of First Embodiment

Yet another example of the print setting screen update display process will be described in a second modification of the first embodiment of the present invention. It is noted that the other points are similar to those described in the first embodiment.

A print setting screen display update display process in accordance with the second modification of the first embodiment of the present invention will be described using FIG. 11.

Figure 11:
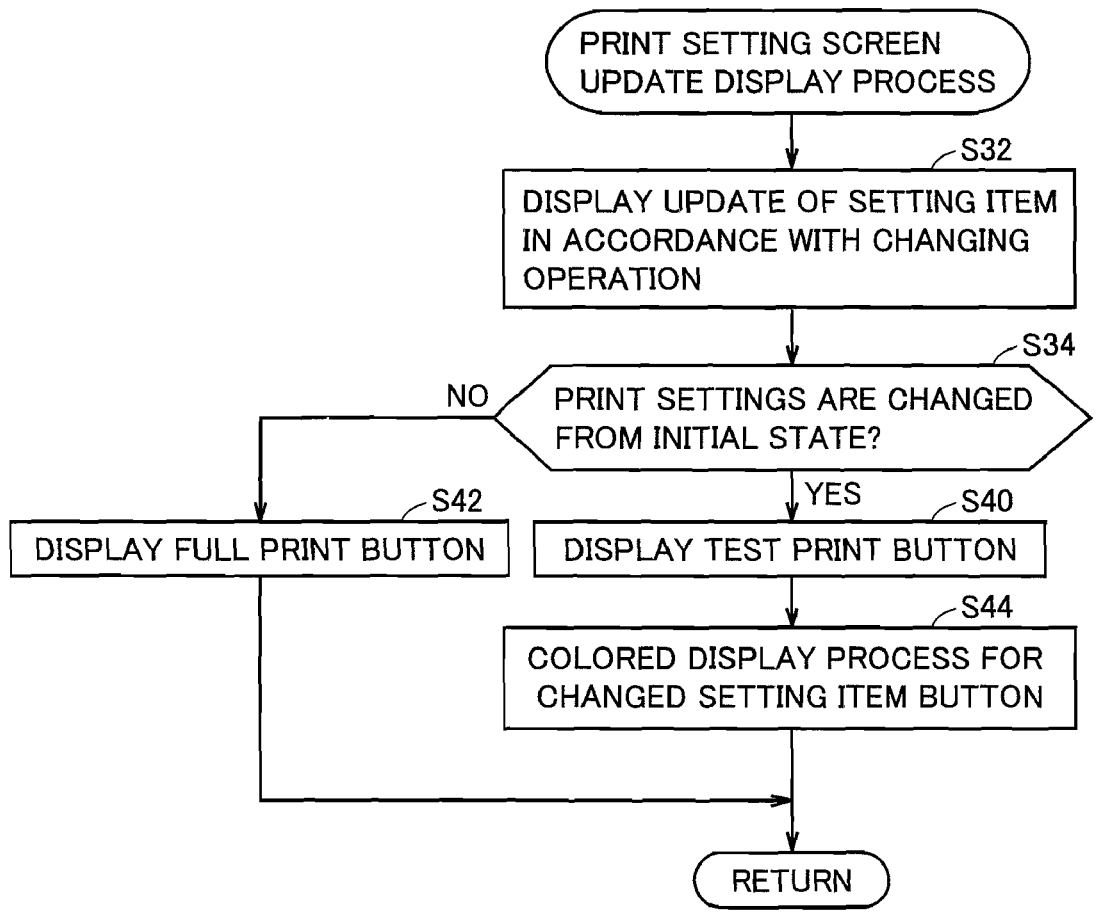
FIG. 11 is a flowchart illustrating a print setting screen update display process in accordance with a second modification of the first embodiment of the present invention.

Referring to FIG. 11, as compared with the process in FIG. 7, step S44 is further added after step S40.

After the test print button is displayed in step S40, then a colored display process is executed for the changed setting item button (step S44). Then, the process returns to the process in FIG. 5 again (RETURN).

A print setting screen subjected to the update display process in the user setting mode in accordance with the second modification of the first embodiment of the present invention will be described using FIG. 12.

Figure 12:
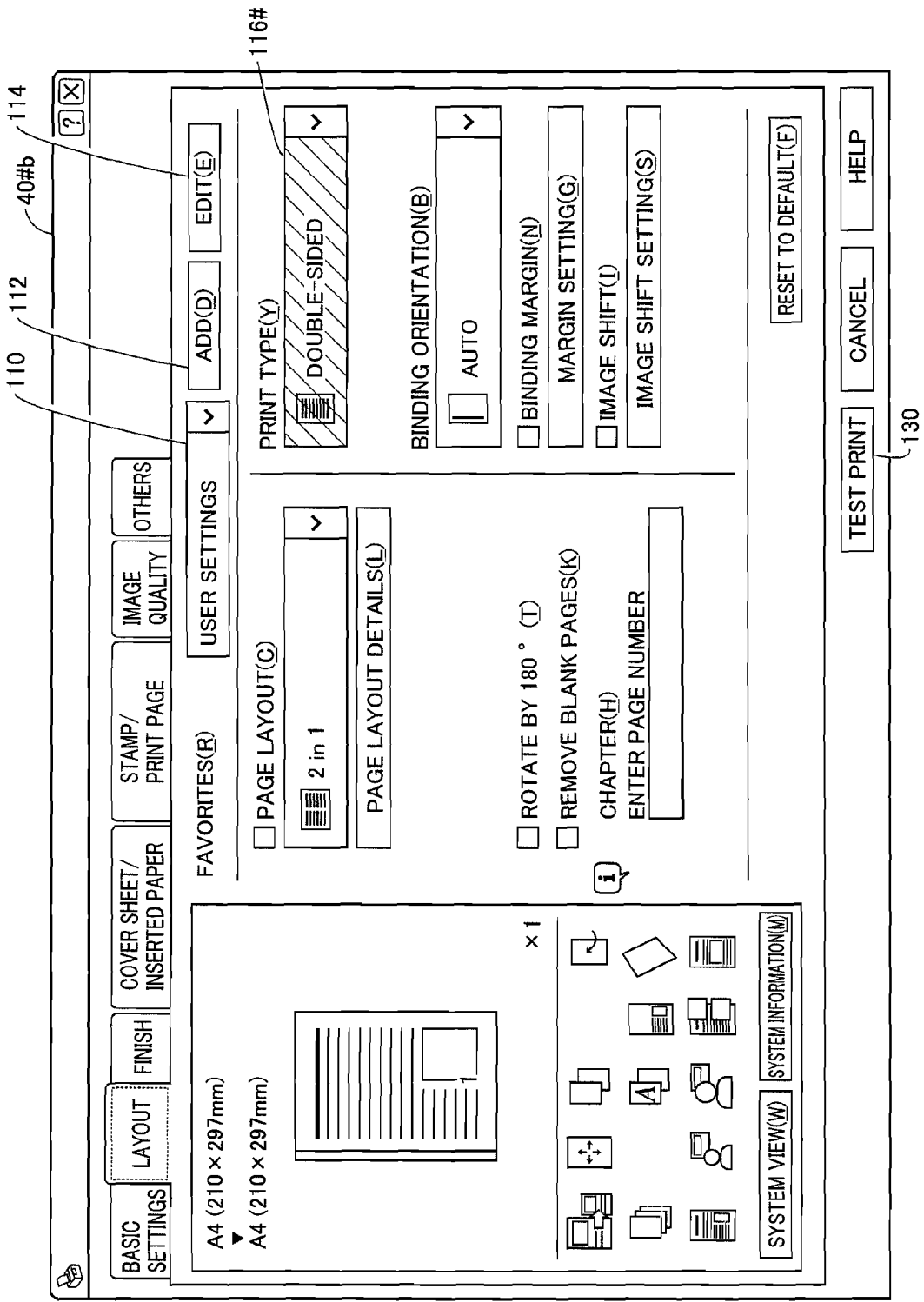
FIG. 12 shows a print setting screen subjected to an update display process in a user setting mode in accordance with the second modification of the first embodiment of the present invention.

Referring to FIG. 12, a print setting screen 40#*b* subjected to the update display process in the user setting mode in accordance with the second modification of the first embodiment of the present invention differs from print setting screen 40# illustrated in FIG. 8 in that item button 116 of settings for print type is changed to item button 116#. Specifically, it is changed in a color (for example, blue, green, or the like) different from that of the other item buttons.

The other points are similar as illustrated in FIG. 8.

Accordingly, when the user operates to change the environment settings concerning printing in print setting screen 40 in the user setting mode as described above, for example, the screen is updated to print setting screen 40#*b* in accordance with the changing operation and test print button 135 is displayed. Therefore, the user can visually recognize that the current print settings are not in the initial state in the user setting mode but are the print settings changed from the initial state through the changing operation because test print button 135 is displayed.

In addition, at that time, the user can visually recognize the changed portion easily since the changed item button is colored.

Furthermore, when the user operates to change the environment settings concerning printing in print setting screen 40#*b* again, for example, when the setting item of print type is changed from "double-sided" to "single-sided," the screen is updated to print setting screen 40 in accordance with the changing operation and only print button 120 is displayed. Therefore, the user can visually recognize that the current print settings are the print settings in the initial state in the user setting mode because only print button 120 is displayed.

Accordingly, the user can easily grasp the changing operation from the user setting mode, and test printing or full printing can be executed in a simple way, thereby allowing execution of printing convenient for users.

Second Embodiment

In the first embodiment, a description has been made to a scheme in which whether the current print settings are in the initial state in the user setting mode or not is determined in the print setting screen. If the actual test print and full print are distinguishable from each other, which printing is done can be determined easily, which is convenient for the user.

A printing process in full printing and test printing in accordance with a second embodiment will be described using FIG. 13.

Figure 13:
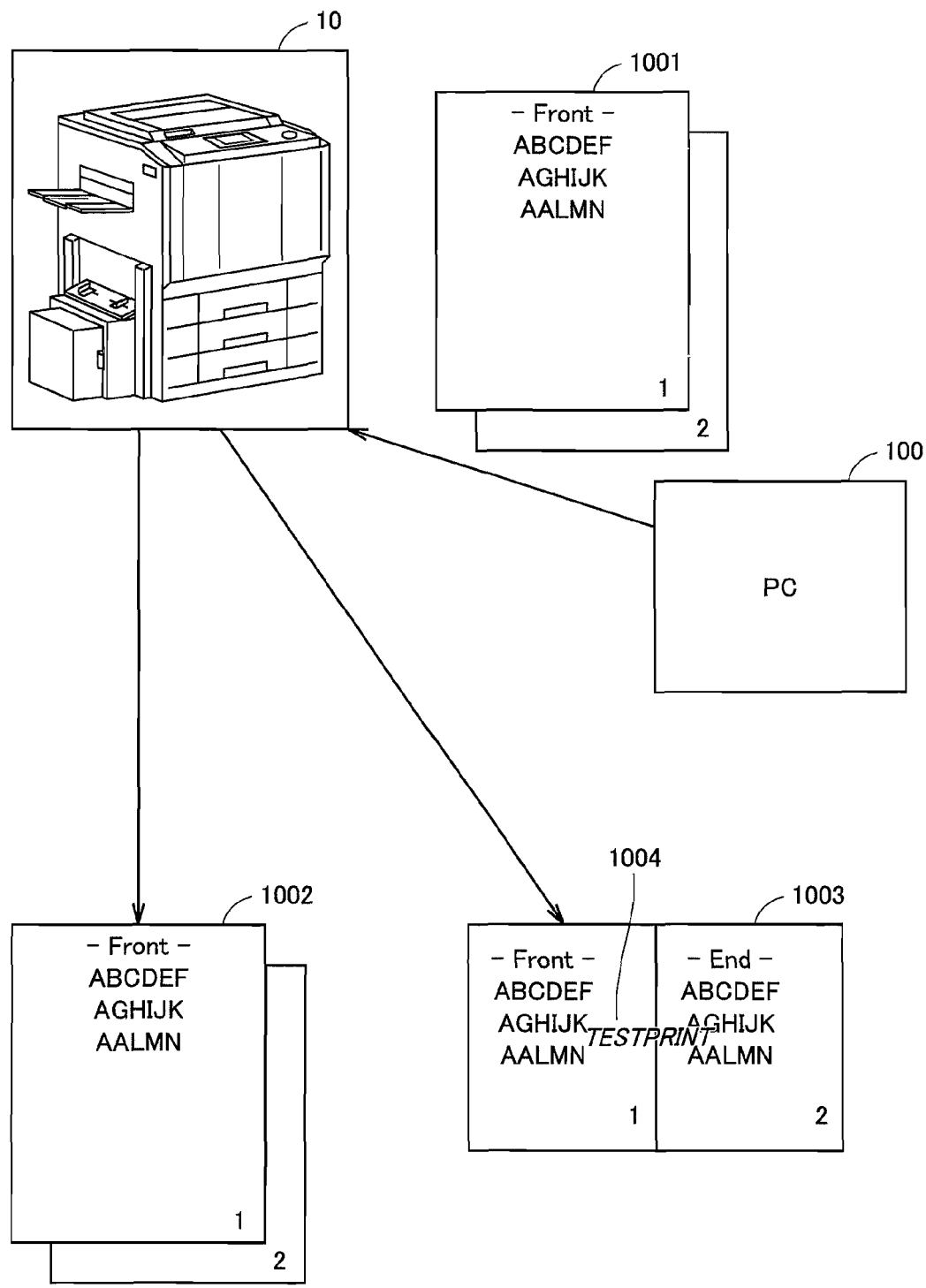
FIG. 13 illustrates a printing process in full printing and test printing in accordance with a second embodiment of the present invention.

Referring to FIG. 13, shown here is an example of full print and test print subjected to a printing process when a print job is transmitted from PC 100 to image forming apparatus 10.

Specifically, shown are a print material 1002 subjected to a printing process in full printing and a printed material 1003 subjected to a printing process of print data 1001 by 2-in-1, in the case where print data 1001 included in a print job is transmitted from PC 100.

Then, in this example, image data displayed as "TESTPRINT" is combined and printed in printed material 1003.

Specifically, when a text print execution instruction is given, driver core 2090 outputs the set print setting information and image data to print data generation portion 2070 and printer control command generation portion 2080. In the scheme in accordance with the present second embodiment, print data generation portion 2070 generates print data for composite data in which image data showing test printing is combined with image data created on an application, if a text print execution instruction is given.

Then, as described above, a print job is output to print spooler 2040 as described above. Then, the print job formed of print data and a printer control command generated in print data generation portion 2070 and printer control command generation portion 2080 is output from print spooler 2040 to image forming apparatus 10 through NIC 207. A printing process as described above is executed in image forming apparatus 10.

In the test printing, a printing process is performed with test image data added to a printed material, so that the user can easily grasp that test printing is done, thereby allowing execution of printing convenient for the user.

Third Embodiment

In the aforementioned first embodiment, a description has been made to a scheme in which whether the current print settings are in the initial state in the user setting mode or not is determined in the print setting screen. A description will now be made to a scheme in which a print setting screen is displayed again after a test print execution instruction.

A process of redisplaying a print setting screen in accordance with a third embodiment of the present invention will be described using FIG. 14.

Figure 14:
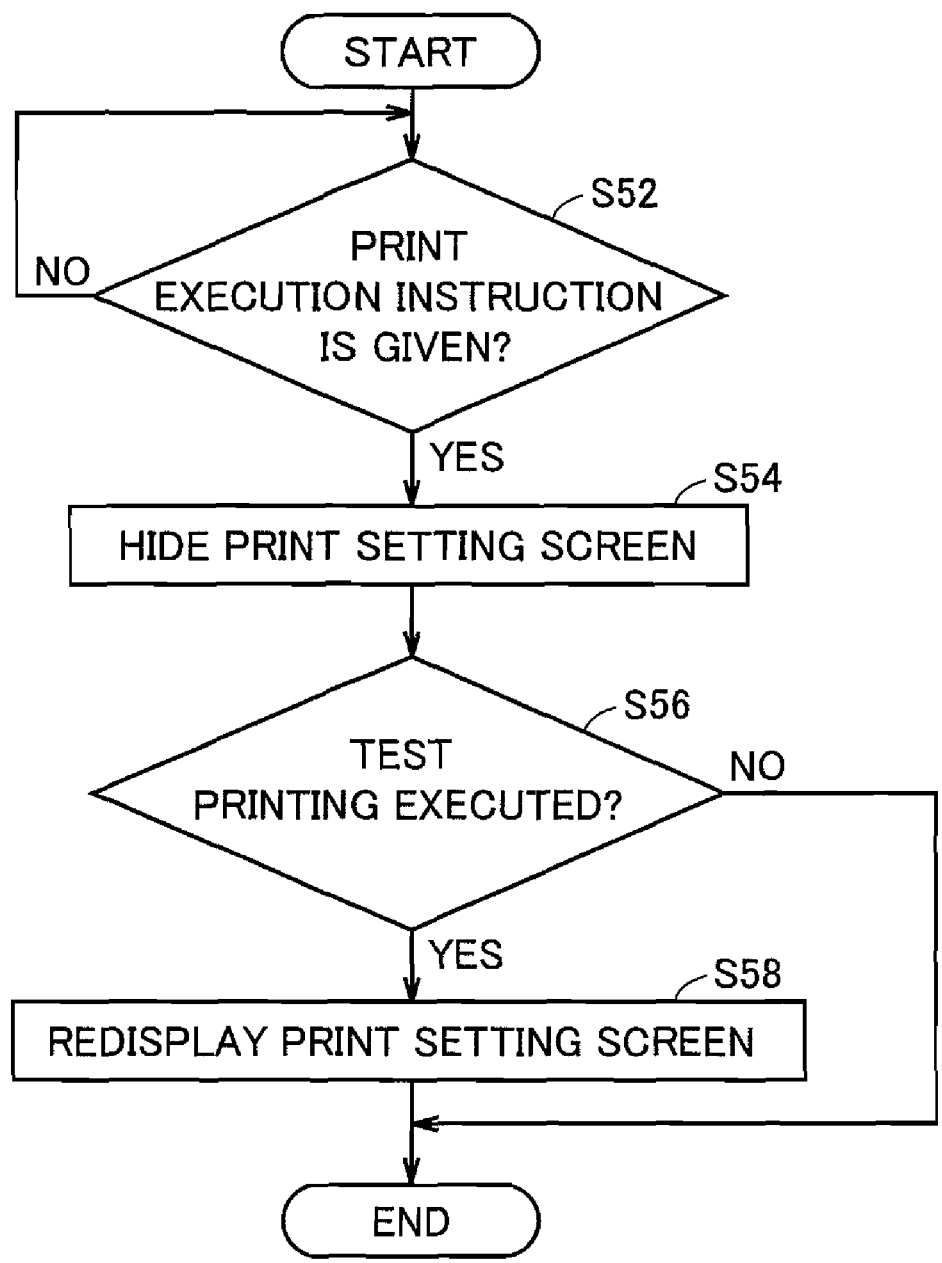
FIG. 14 is a flowchart illustrating a process of redisplaying a print setting screen in accordance with a third embodiment of the present invention.

Referring to FIG. 14, driver core 2090 determines whether a print execution instruction is given or not (step S52). If it is determined that a print execution instruction is given in step S52, driver core 2090 instructs setting display portion 2110 of driver GUI 2100 to terminate display of the print setting screen. In other words, the print setting screen is hided (step S54).

Then, driver core 2090 determines whether or not the print execution instruction is to execute test printing (step S56). If it is determined that the print execution instruction is to execute test printing in step S56, driver core 2090 instructs setting display portion 2110 of driver GUI 2100 to redisplay the print setting screen (step S58). Then, the process is ended (END). On the other hand, if it is determined that the print execution instruction is not to execute test printing but to execute full printing in step S56, the process is ended as it is (END).

It is assumed that, in this example, the redisplayed print setting screen is the print setting screen based on the print setting information set at the time of test printing, by way of example.

Redisplay of the print setting screen in test printing in accordance with the third embodiment of the present invention will be described using FIG. 15.

Figure 15:
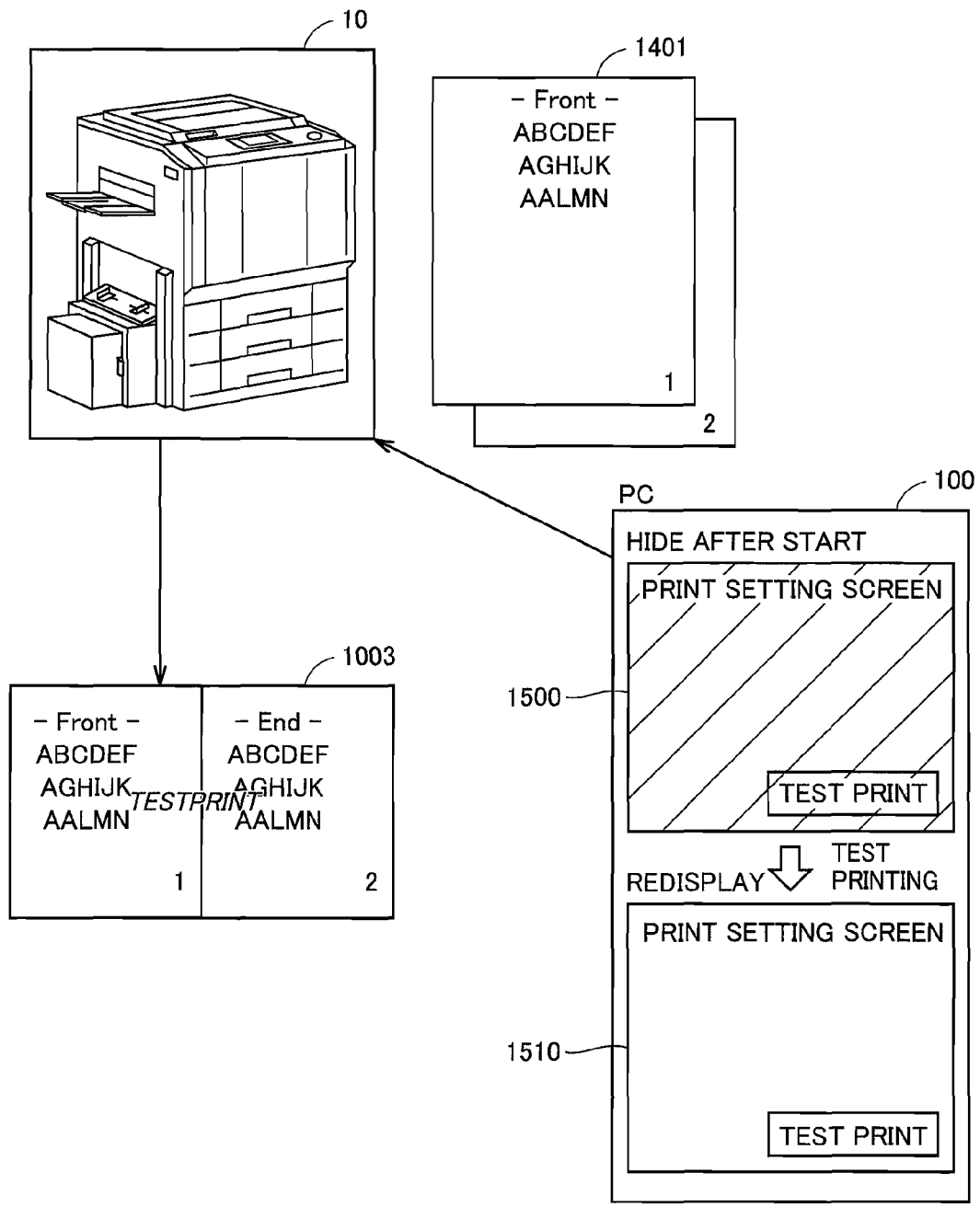
FIG. 15 illustrates redisplay of a print setting screen in test printing in accordance with the third embodiment of the present invention.

Referring to FIG. 15, here, it is shown that a print setting screen 1500 is hided in PC 100 after starting of test printing. It is also shown that a print setting screen 1510 is redisplayed again.

Through this process, the print setting screen is redisplayed, because full printing or again test printing is executed after a test print execution instruction is given. Therefore, the user can omit a process of giving an instruction to activate print setting and then opening the print setting screen again, which is convenient for the user.

In addition, the print setting screen is hided temporarily, so that the user can easily grasp that a print execution instruction is given, thereby allowing execution of printing convenient for users.

Modification of Third Embodiment

A process of redisplaying a print setting screen in accordance with a modification of the third embodiment will be described using FIG. 16.

Figure 16:
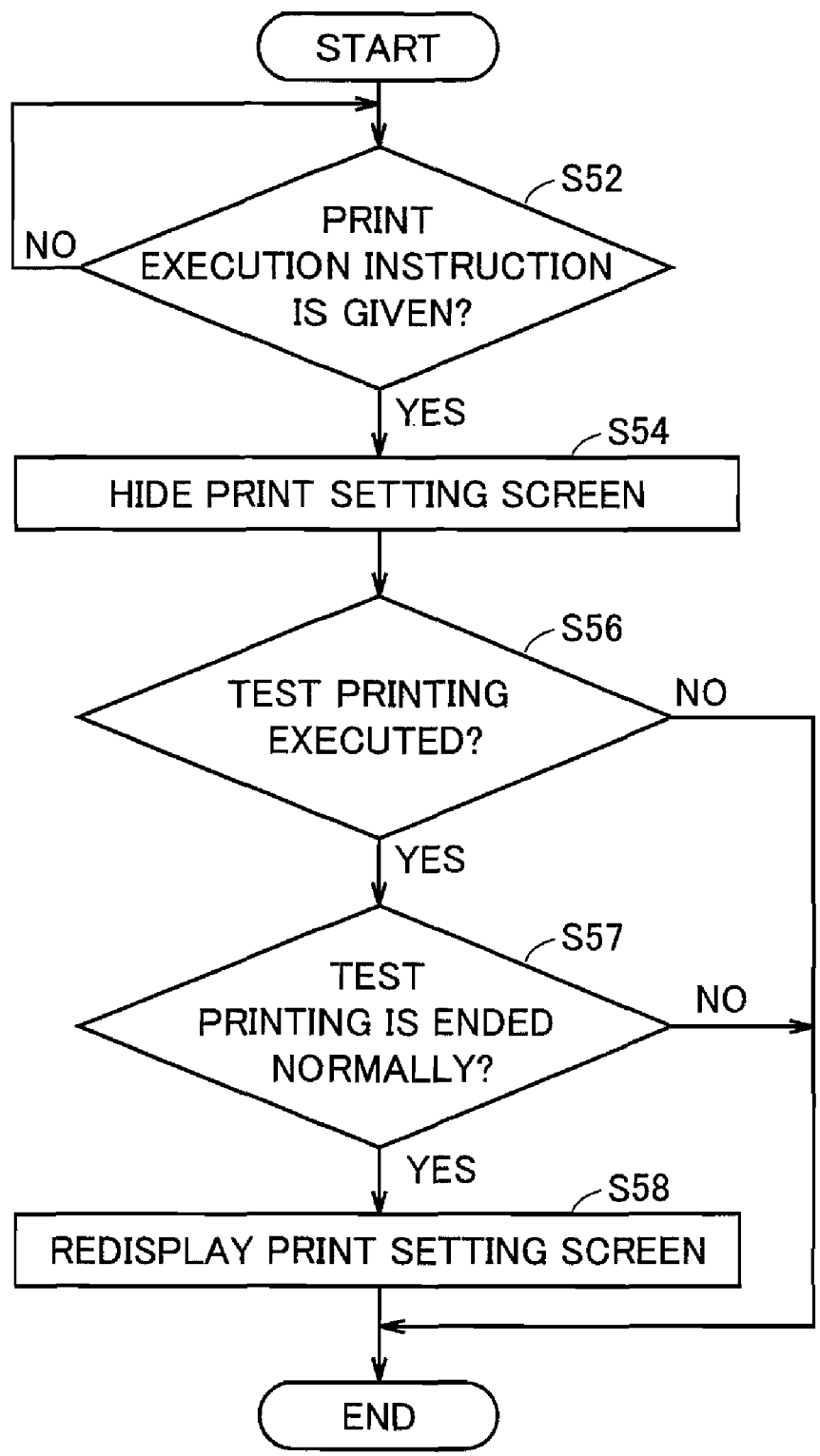
FIG. 16 is a flowchart illustrating a process of redisplaying a print setting screen in accordance with a modification of the third embodiment of the present invention.

Referring to FIG. 16, driver core 2090 determines whether or not a print execution instruction is given (step S52). If it is determined that a print execution instruction is given in step S52, driver core 2090 instructs setting display portion 2110 of driver GUI 2100 to terminate display of the print setting screen. In other words, the print setting screen is hided (step S54).

Then, driver core 2090 determines whether or not the print execution instruction is to execute test printing (step S56). If it is determined that the print execution instruction is to execute test printing in step S56, then it is determined whether or not test printing is ended successfully (step S57).

Specifically, a print job is transmitted from PC 100 to image forming apparatus 10. When a printing process for the print job is ended successfully or ended in an error process in image forming apparatus 10, image forming apparatus 10 notifies PC 100 that the printing process is ended successfully or in an error process.

PC 100 detects a notification signal indicating that the printing process is ended which is transmitted from image forming apparatus 10.

If driver core 2090 determines that test printing is ended successfully in accordance with the notification signal from image forming apparatus 10, driver core 2090 instructs setting display portion 2110 of driver GUI 2100 to redisplay the print setting screen (step S58). The process is then ended (END). On the other hand, if test printing is not ended successfully in step S57, the process is ended (END).

On the other hand, if the print execution instruction is not to execute test printing but to execute full printing in step S56, the process is ended as it is (END).

Through this process, the print setting screen is redisplayed, because full printing or again test printing is executed after a test print execution instruction is given. Therefore, the user can omit a process of giving an instruction to activate print setting and then opening the print setting screen again, which is convenient for the user.

Then, in this example, it can be easily grasped that test printing is ended successfully because of the process of redisplaying the print setting screen, thereby allowing execution of printing convenient for users.

Although the redisplayed print setting screen is the print setting screen based on the print setting information set at the time of test printing in the foregoing description, by way of example, the redisplayed print setting screen may be displayed based on the print setting information set as a prescribed format in full printing.

It is noted that a program that allows a computer to function and execute the control as illustrated in the above-noted flows may be provided. Such a program may be recorded in a computer readable recording medium such as a flexible disk, a CD-ROM (Compact Disk-Read Only Memory), a ROM (Read Only Memory), a RAM (Random Access Memory), and a memory card, which accompanies a computer, and be provided as a program product. Alternatively, the program may be recorded in a recording medium such as a hard disk contained in a computer. Alternatively, the program may be downloaded via a network.

The program may allow the process to be executed by invoking necessary modules, among program modules provided as a part of Operating System (OS) of a computer, in a prescribed sequence at a prescribed timing. In this case, the aforementioned modules are not included in the program itself and the process is executed in cooperation with OS. The program that does not include such modules may also be included in the program in accordance with the present invention.

Furthermore, the program in accordance with the present invention may be built in a part of another program. In this case, the modules included in another program are not included in the program itself, and the process is executed in cooperation with another program. Such a program built in another program may also be included in the program in accordance with the present invention.

The program product to be provided is installed in a program storage portion such as a hard disk for execution. It is noted that the program product includes the program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing apparatus transferring image data created by a software application operating on a computer to an image forming apparatus for printing, comprising:
    a display for displaying information: and
    a controller for controlling said information processing apparatus, said controller being configured to
        i) display on said display a print setting screen in which prescribed print setting information showing a manner of printing of said image data in said image forming apparatus is set, which is transferred in association with said image data when printing of said image data is to be executed,
ii) accept a change in settings of said prescribed print setting information in accordance with a user operation in said print setting screen, and
iii) update said print setting screen when said change in settings of said prescribed print setting information is accepted,
wherein said controller displays in said print setting screen a print button being used for giving an instruction to execute full printing before updating said print setting screen, and displays a test print button being used for giving an instruction to execute test printing upon updating said print setting screen.

2. The information processing apparatus according to claim 1, wherein in connection with said updated said print setting screen, said print button for giving an instruction to execute full printing is displayed together with said test print button for executing test printing.

3. The information processing apparatus according to claim 1, wherein
a plurality of setting selection items allowing said prescribed print setting information to be changed in accordance with a user operation are displayed in said print setting screen, and
said controller changes display of a setting selection item having a change accepted, among said plurality of setting selection items, in accordance with a user operation in said print setting screen.

4. The information processing apparatus according to claim 1, wherein said controller
combines image data indicating test print with said image data when an instruction to execute said test print button is given, in connection with said print setting screen updated in accordance with a user operation, and
transfers a print job including the combined image data to said image forming apparatus.

5. The information processing apparatus according to claim 1, wherein in connection with said print setting screen updated in accordance with a user operation, said controller redisplays said print setting screen when an instruction to execute said test print button is given.

6. The information processing apparatus according to claim 5, wherein said controller
detects completion of said test printing in said image forming apparatus when an instruction to execute said test print button is given, in connection with said print setting screen updated in accordance with said user operation, and
redisplays said print setting screen when completion of said test printing in said image forming apparatus is detected.

7. The information processing apparatus according to claim 5, wherein in connection with said print setting screen updated in accordance with said user operation, said print setting screen set when an instruction to execute said test print button is given is redisplayed.

8. A method of controlling an information processing apparatus transferring image data created by a software application operating on a computer to an image forming apparatus for printing, comprising the steps of:
displaying on a display a print setting screen in which prescribed print setting information showing a manner of printing of said image data in said image forming apparatus is set, which is transferred in relation to said image data when printing of said image data is executed;
accepting a change in settings of said prescribed print setting information in accordance with a user operation in said print setting screen; and
updating said print setting screen when said change in settings of said prescribed print setting information is accepted, wherein
said step of displaying includes the step of displaying in said print setting screen a print button being used for giving an instruction to execute full printing, and
said step of updating includes the step of displaying a test print button being used for giving an instruction to execute test printing.

9. The method of controlling an information processing apparatus according to claim 8, wherein said step of updating said print setting screen includes the step of displaying said print button for giving an instruction to execute full printing together with said test print button for executing test printing.

10. The method of controlling an information processing apparatus according to claim 8, wherein
a plurality of setting selection items allowing said prescribed print setting information to be changed in accordance with a user operation are displayed in said print setting screen, and
said step of updating said print setting screen includes the step of changing display of a setting selection item having a change accepted, among said plurality of setting selection items, in accordance with a user operation in said print setting screen.

11. The method of controlling an information processing apparatus according to claim 8, further comprising the steps of:
combining image data indicating test printing with said image data when an instruction to execute said test print button is given, in connection with said print setting screen updated in accordance with a user operation; and
transferring a print job including the combined image data to said image forming apparatus.

12. The method of controlling an information processing apparatus according to claim 8, further comprising the step of redisplaying said print setting screen when an instruction to execute said test print button is given, in connection with said print setting screen updated in accordance with a user operation.

13. The method of controlling an information processing apparatus according to claim 12, wherein said step of redisplaying said print setting screen includes the steps of:
detecting completion of said test printing in said image forming apparatus when an instruction to execute said test print button is given, in connection with said print setting screen updated in accordance with said user operation; and
redisplaying said print setting screen when completion of said test printing in said image forming apparatus is detected.

14. The method of controlling an information processing apparatus according to claim 12, wherein said step of redisplaying said print setting screen redisplays said print setting screen set when an instruction to execute said test print button is given, in connection with said print setting screen updated in accordance with said user operation.

15. A non-transitory computer-readable recording medium having a control program recorded thereon for an information processing apparatus transferring image data created by a software application operating on a computer to an image forming apparatus for printing, said control program allowing said computer to execute the steps of:

displaying on a display a print setting screen in which prescribed print setting information showing a manner of printing of said image data in said image forming apparatus is set, which is transferred in relation to said image data when printing of said image data is executed;

accepting a change in settings of said prescribed print setting information in accordance with a user operation in said print setting screen; and updating said print setting screen when said change in settings of said prescribed print setting information is accepted, wherein said step of displaying includes the step of displaying in said print setting screen a print button being used for giving an instruction to execute full printing, and said step of updating includes the step of displaying a test print button being used for giving an instruction to execute test printing.

16. The non-transitory computer-readable recording medium having a control program recorded thereon according to claim 15, wherein said step of updating said print setting screen includes the step of displaying said print button for giving an instruction to execute full printing together with said test print button for executing test printing.

17. The non-transitory computer-readable recording medium having a control program recorded thereon according to claim 15, wherein a plurality of setting selection items allowing said prescribed print setting information to be changed in accordance with a user operation are displayed in said print setting screen, and said step of updating said print setting screen includes the step of changing display of a setting selection item having a change accepted, among said plurality of setting selection items, in accordance with a user operation in said print setting screen.

18. The non-transitory computer-readable recording medium having a control program recorded thereon according to claim 15, wherein said control program allows said computer to further execute the steps of:

combining image data indicating test printing with said image data when an instruction to execute said test print button is given, in connection with said print setting screen updated in accordance with a user operation; and transferring a print job including the combined image data to said image forming apparatus.

19. The non-transitory computer-readable recording medium having a control program recorded thereon according to claim 15, wherein said control program allows said computer to further execute the step of redisplaying said print setting screen when an instruction to execute said test print button is given, in connection with said print setting screen updated in accordance with a user operation.

20. The non-transitory computer-readable recording medium having a control program recorded thereon according to claim 19, wherein said step of redisplaying said print setting screen includes the steps of:

detecting completion of said test printing in said image forming apparatus when an instruction to execute said test print button is given, in connection with said print setting screen updated in accordance with said user operation; and redisplaying said print setting screen when completion of said test printing in said image forming apparatus is detected.

21. The non-transitory computer-readable recording medium having a control program recorded thereon according to claim 19, wherein said step of redisplaying said print setting screen redisplays said print setting screen set when an instruction to execute said test print button is given, in connection with said print setting screen updated in accordance with said user operation.

* * * * *